July 10, 1962  R. E. PEARSON  3,043,410
LOCKING MEANS FOR SWING-TAIL AIRPLANES
Filed Aug. 10, 1959  3 Sheets-Sheet 1

INVENTOR.
RAYMOND E. PEARSON
BY
Reynolds, Beach & Christensen
ATTORNEYS

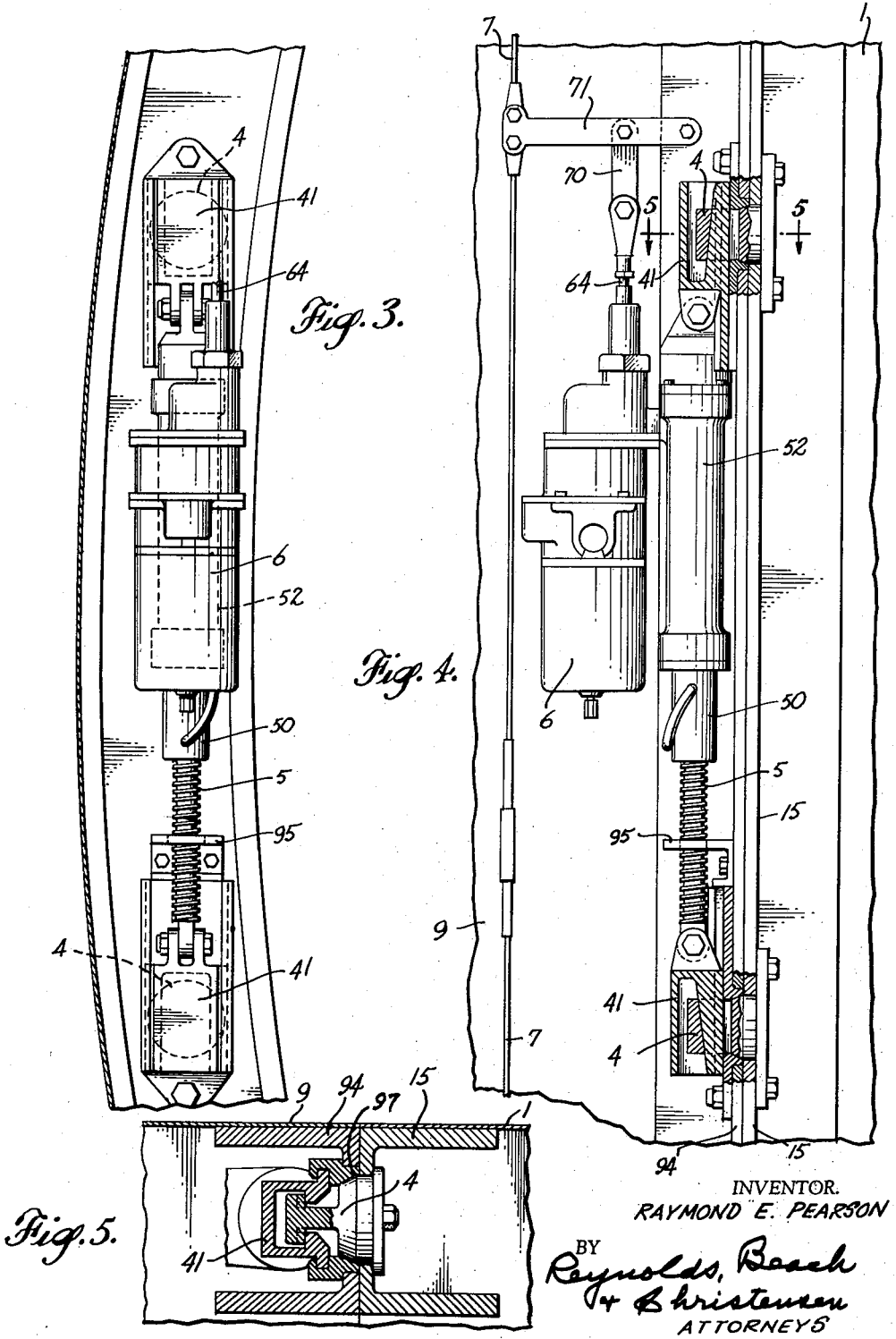

July 10, 1962 — R. E. PEARSON — 3,043,410
LOCKING MEANS FOR SWING-TAIL AIRPLANES
Filed Aug. 10, 1959 — 3 Sheets-Sheet 3

INVENTOR.
RAYMOND E. PEARSON
BY
Reynolds, Beach & Christensen
ATTORNEYS

3,043,410
LOCKING MEANS FOR SWING-TAIL AIRPLANES
Raymond E. Pearson, Bellevue, Wash., assignor to Boeing Airplane Company, Seattle, Wash., a corporation of Delaware
Filed Aug. 10, 1959, Ser. No. 832,702
2 Claims. (Cl. 189—35)

The present invention relates generally to airplanes of the type in which a tail section is separate from the fuselage of which it constitutes a rearward continuation, but is hingedly or swingably mounted upon the fuselage to swing either aside or upward to afford access to the open rear end of the fuselage and the cargo space within the same. Such an airplane is shown by way of example in my companion application, Serial No. 832,699, now Patent No. 2,977,077, or in the companion application of Richard H. Weiland, Serial No. 832,700, both filed August 10, 1959.

Cargo airplanes of the type mentioned are designed to mount the empennage and the movable control surfaces associated therewith upon the swingably mounted tail section, maintaining the control cables or like control elements permanently connected across the hinge line between the pilot's controls on the fuselage and the movable surfaces on the tail section. By reason of the mounting of such control surfaces upon the swingably mounted tail section, it is necessary to transmit appreciable stresses between the tail section and the fuselage while the airplane is in flight. It follows that it is highly essential that there be secure locking means employed, not only to prevent accidental release of the tail section but to transmit the flight stresses.

The present invention relates to a particular locking mechanism for such installations. The locking means of this invention includes a lead screw and a nut element threadedly interconnected, controlling latch means, preferably arranged in pairs, one latch means being connected for movement with the lead screw and the other for movement with the nut element, and capable of separation or approach by the threaded relative movement between the two, so that they substantially simultaneously engage or disengage latch pins which are carried upon the other part of the airplane. The actuator means for effecting relative rotation between the nut element and the lead screw preferably incorporates a gear train and includes means for locking the nut element and lead screw, preferably through the gear train, against relative unlocking rotation.

It is an object of this invention to provide locking mechanism of the general nature indicated for use in the installation mentioned, which shall be of simple construction, relatively light, and thoroughly reliable in operation, and capable of locking the parts either in open or in closed and locked positions.

FIGURE 3 is an elevational view of the actuator means and the two associated latch elements, showing the parts in locked position, and FIGURE 4 is an elevational view from a viewpoint at 90° to FIGURE 3, showing the same parts, and itself partly broken away.

FIGURE 5 is a transverse sectional view of a detail along the line indicated at 5—5 in FIGURE 4.

Figure 1:
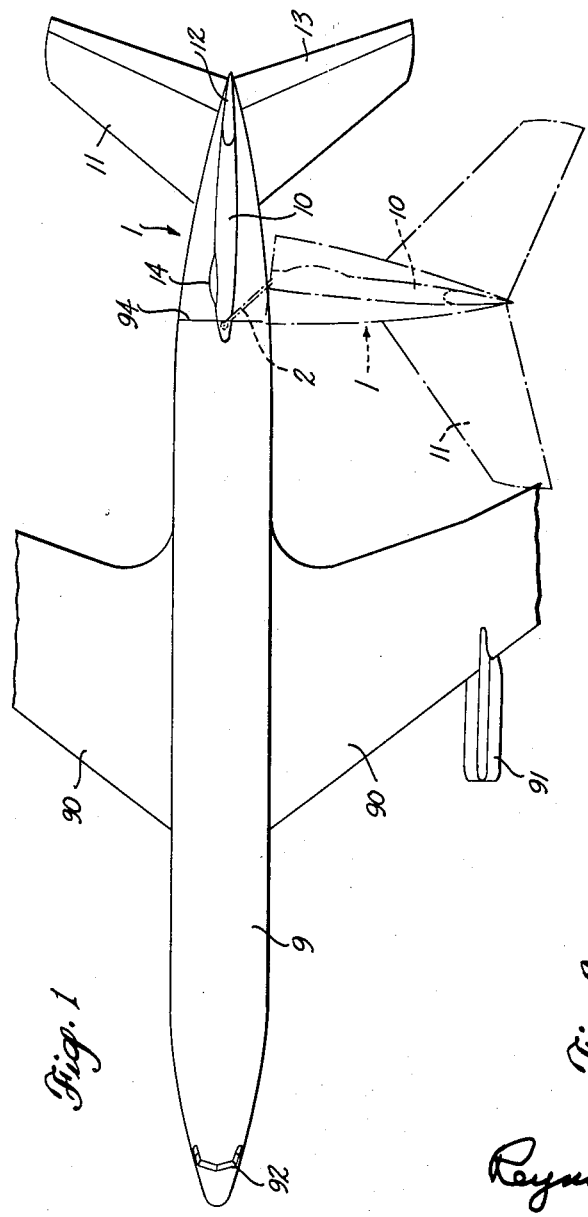
FIGURE 1 is a general plan view of an airplane incorporating the present invention, with parts of the wings broken away.

The airplane in which this invention is installed is, with the exception of the swingable tail, of a known type, now flying, which includes a fuselage 9, supported in the air by wings 90 and powered by jet motors 91. On the ground the airplane is supported upon landing gear 93. The control cabin is at 92 in the nose of the fuselage, and the fuselage, differing from the known airplane, terminates at its rear end at a frame 94 defining an opening admitting to a cargo space 95 within the fuselage, having a deck 96.

The tail section 1 includes the vertical and horizontal stabilizers 10 and 11 respectively, with control surfaces such as are indicated by the rudder 12 and elevators 13. This tail section is hingedly mounted upon the rear end of the fuselage 9 to swing between closed and open positions, for instance between the full line position of FIGURE 1 and the dot-dash line position thereof. A screw 2, or the like, extending between the fuselage and the tail section effects such swinging movement of the tail section 1, and budge 14 may be provided to afford freedom of swinging of the rear end of this screw 2.

It may be assumed that the frame 94 outlines the opening at the rear end of the fuselage. The tail section 1 is provided with a similar encircling frame 15. In the closed position of the tail section these two frames 94 and 15 abut, and it is in order to maintain them in this position that the locking means of the present invention is devised. To this end one or the other of these frames, and it is immaterial which, carries longitudinally directed locking pins 4 and the other frame is apertured at 97 for the reception of these locking pins. The locking pins 4 are shown mounted upon the frame 15; mounted upon the other frame, in this instance the frame 94, is a latch element 41 which cooperates with the pin 4 to lock the fuselage and the tail section together. Preferably, in accordance with the present invention, two spaced pins are paired for cooperation each with complemental latching elements 41, which are connected respectively to a lead screw 5 and to a nut element 50, which lead screw and nut element are relatively rotatable. By their relative rotation, they effect approach of the latching elements 41 for disengagement from their respective pins 4, or separation thereof for engagement. Any suitable means may be employed, as may be found necessary, such as the guide channels 44, for guidance of the latch elements 41 into and from the position of engagement with their respective locking pins.

The nut element 50 is part of a housing 51 which is journaled within an exterior casing 52, the lead screw 5 in this instance being non-rotative. Rotation of the housing 51 is accomplished by means such as the reversible electric motor 6 carried by the casing 52 and rotatively connected to the housing 51 through a gear train which includes a driving gear 61 and a gear 62 in mesh at all times with the driving gear 61, and connected directly or through other gears of the train to a gear 56 upon the housing 51. All gears of the gear train are constantly in mesh. Rotation of the motor 6 will effect approach or separation of the paired latching means 41.

Figure 8:
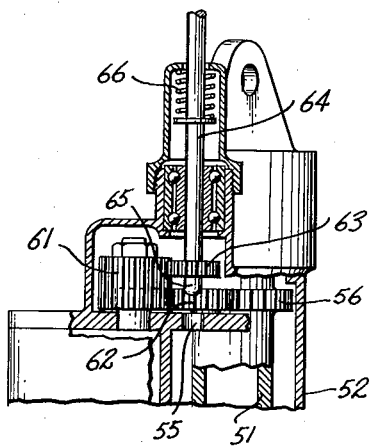
FIGURE 8 is a sectional view taken substantially at the line 8—8 of FIGURE 7.

Rotation of the gears of the gear train may be prevented in any of several ways, or by two or more thereof in combination. Thus, as may be seen in FIGURE 8, a gear 63 is employed in constant mesh with the driving gear 61 but shiftable longitudinally of the latter. In one position the gear 63 meshes also with the gear 62 and thereby prevents rotation of the gear 62 by means of the driving gear 61. This effectively locks the gear train and all parts driven thereby against movement. The gear 63 is shiftable in the manner indicated by means such as the rod 64, the end 65 whereof may project to engage within an aperture 55 in the casing 52. This affords a close-up support whereby locking gear 63 is strongly held in its locking position, to lock the gear train against rotation. The rod 64 is preferably biased, as by the spring means 66, towards the locking position.

Control of the several pairs of latch means angularly spaced about the frame at 94 is effected in any suitable manner. For example, each rod 64 is engaged by a link 70 connected to a lever 71 pivoted upon frame 94, which lever in turn is connected to other like levers at different stations by the tension rod or cable 7, which in turn is moved by any suitable means (not shown), such for example as a hand lever operated by an attendant in the cargo space. Upon release of the several latch means, the several screw means can be energized singly or conjointly.

Figure 2:
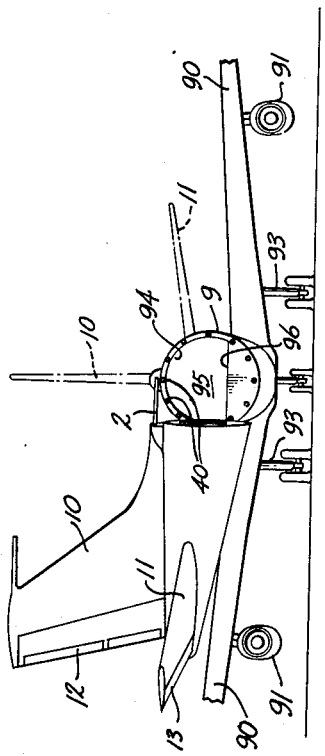
FIGURE 2 is a rear view of the same.
Figure 7:
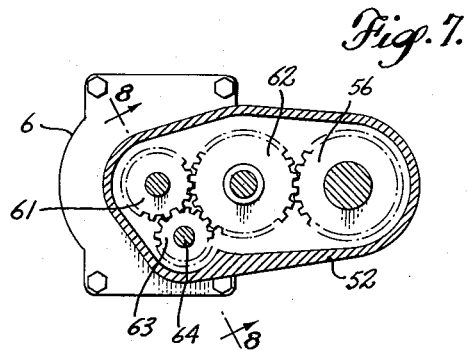
FIGURE 7 is a transverse sectional view of a detail, taken at the line 7—7 of FIGURE 6.
Figure 6:
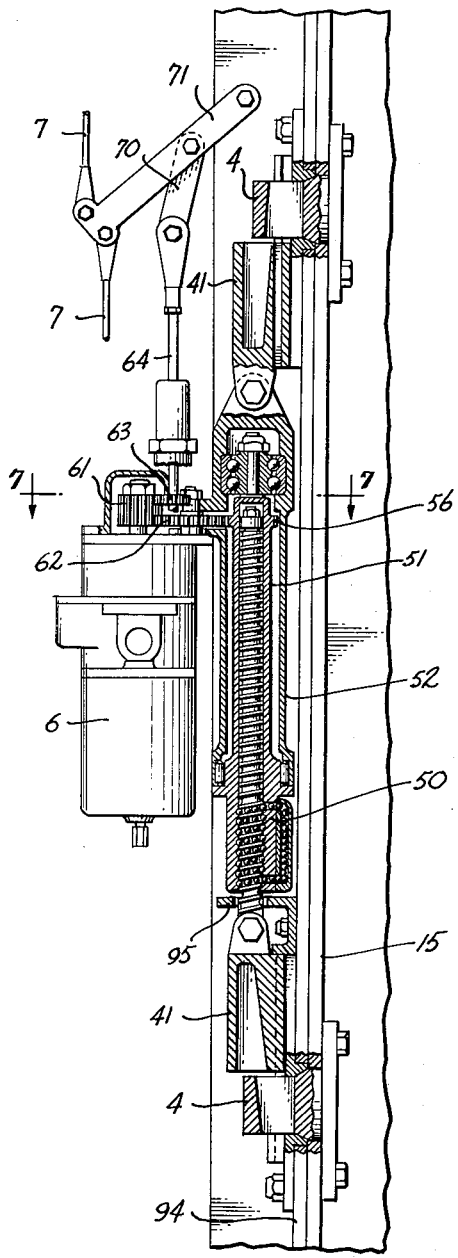
FIGURE 6 is a view similar to FIGURE 4 but showing parts in section and in the unlatched position.

Assuming the tail section to be locked in its flight position as shown in FIGURES 3, 4 and 5, the attendant moves the rods or cables 7 to withdraw the locking tip 65 from its recess 55 and to withdraw the locking gear 63 from mesh with the gear 62. Now the motors 6 at the several stations are energized in a direction to effect approach of the paired latch means 41, and these are withdrawn from the pins 4 to a position such as shown in FIGURE 6. Now the tail section 1 may be swung aside, for instance to the full line position of FIGURE 2 or to the dot-dash line position of FIGURE 1, its movement being effected by the screw 2 or similar means. When the loading or unloading operation is completed, the tail section is swung back into flight position, which projects the pins 4 through the apertures 97 for them in the frame 94, and now by reversing the direction of rotation of the motors 6 and their nut means 50, the latch means 41 are separated again and come into engagement with their respective pins 4. The latch mechanism floats between the two pins of a pair and it may happen that one such latch is engaged before the other is engaged. However, a ledge 95 is positioned to limit extensional movement of the nut means 50, and upon the longitudinal movement of the one nut means ceasing, the opposite latches 41 are still caused to continue their separation until they are both in full engagement with their respective pins. The interengaging surfaces of the latch means and pins may be tapered, T-shaped, or otherwise formed for secure engagement and retention.

I claim as my invention:

1. Locking means for joining a first and a second relatively separable and mutually stress-resisting members, or for release and separation thereof, said locking means comprising a plurality of spaced locking pins carried by the first such member, projecting towards the second, latch means arranged in pairs and guided upon the second member for separational movement into locking engagement with corresponding pins and for approach movement to disengage the same, the screw means interconnecting the paired latch means to separate them or to effect their approach, means to lock the screw means against rotation, and means interconnecting the several screw locking means for simultaneous and like release or engagement of each thereof.

2. Locking means as in claim 1, including a motor to rotate the screw means, and wherein the means to lock the screw means against rotation includes a gear train intermediate the motor and the screw means, a locking gear shiftable axially between a locking position wherein it meshes with two gears of the gear train, and a released position disengaged from at least one of the two gears, a rod movable axially with said locking gear, and a hole in the second member aligned with said rod and positioned to be entered thereby when the locking gear engages both gears of the gear train.

References Cited in the file of this patent

UNITED STATES PATENTS

| | | |
|---|---|---|
| 363,118 | Corry | May 17, 1887 |
| 1,376,355 | Phipps | Apr. 26, 1921 |
| 1,536,072 | Byrant | May 5, 1925 |
| 1,859,306 | Loening | May 24, 1932 |
| 2,166,564 | Atwood et al. | July 18, 1939 |
| 2,682,780 | Pickles | July 6, 1954 |
| 2,778,239 | Hoover | Jan. 22, 1957 |
| 2,833,580 | Hogan | May 6, 1958 |

FOREIGN PATENTS

| | | |
|---|---|---|
| 679,057 | Great Britain | Sept. 10, 1952 |

UNITED STATES PATENT OFFICE
CERTIFICATE OF CORRECTION

Patent No. 3,043,410            July 10, 1962

Raymond E. Pearson

It is hereby certified that error appears in the above numbered patent requiring correction and that the said Letters Patent should read as corrected below.

Column 4, line 12, for "the screw" read -- and screw --.

Signed and sealed this 6th day of November 1962.

(SEAL)
Attest:

ERNEST W. SWIDER
Attesting Officer

DAVID L. LADD
Commissioner of Patents